United States Patent [19]

Yamagata et al.

[11] Patent Number: 4,538,957
[45] Date of Patent: Sep. 3, 1985

[54] MULTI-STAGE HYDRAULIC MACHINE AND CONTROL METHOD FOR MULTI-STAGE HYDRAULIC MACHINE

[75] Inventors: Ichiro Yamagata, Yokohama; Shinsaku Sato, Ebina, both of Japan

[73] Assignee: Tokyo Shibaura Denki Kabushiki Kaisha, Kawasaki, Japan

[21] Appl. No.: 536,733

[22] Filed: Sep. 28, 1983

[30] Foreign Application Priority Data

Sep. 28, 1982 [JP] Japan ................ 57-167706

[51] Int. Cl.$^3$ .............................................. F01D 17/00
[52] U.S. Cl. ........................................ 415/1; 415/26; 415/500
[58] Field of Search ............... 415/1, 500, 26, 110, 415/112

[56] References Cited

U.S. PATENT DOCUMENTS

| 4,280,788 | 7/1981 | Tsunoda et al. | 415/1 |
| 4,412,779 | 11/1983 | Tsunoda et al. | 415/1 |
| 4,431,370 | 2/1984 | Ichikawa et al. | 415/1 X |
| 4,468,167 | 8/1984 | Ogiwara et al. | 415/500 X |

FOREIGN PATENT DOCUMENTS 47-38336  9/1972  Japan .
54-114648  9/1979  Japan .

Primary Examiner—Robert E. Garrett
Assistant Examiner—Joseph M. Pitko
Attorney, Agent, or Firm—Obion, Fisher, Spivak, McClelland & Maier

[57] ABSTRACT

A multi-stage hydraulic machine includes a rotatable shaft, a plurality of runners fixed to the shaft and arranged from a highest-pressure stage to a lowest-pressure stage, runner chambers which respectively house the runners, a return channel for connecting adjacent ones of the runner chambers with each other, movable wicket gates provided at least in the runner chamber of the highest-pressure stage and capable of moving between a position in which the movable wicket gates block the channel and a position in which said movable wicket gates open the channel, and a draft tube connected to the runner chamber of the lowest-pressure stage. For controlling the machine, there are included means for feeding compressed air into the runner chamber of the highest-pressure stage, a plurality of communicating pipes, including valves connected with the runner chamber of each of the stages, a water feeding pipe having a valve, communicated between the return channel adjacent to the runner chamber of the lowest-pressure stage and the draft tube, a plurality of pressure detecting means arranged at the runner chamber of each of the stages, respectively, and means for controlling the valves of the communicating pipes and water feeding pipe in response to the output of the pressure detecting means.

6 Claims, 3 Drawing Figures

MULTI-STAGE HYDRAULIC MACHINE AND CONTROL METHOD FOR MULTI-STAGE HYDRAULIC MACHINE

BACKGROUND OF THE INVENTION

1. Field of the Invention

The present invention relates to a multi-stage hydraulic machine and to a control method for a multi-stage hydraulic machine having a plurality of stages from the highest-pressure stage to the lowest-pressure stage. More particularly, the present invention relates to a multi-stage hydraulic machine and a control method for a multi-stage hydraulic machine in which the runner chambers of adjacent stages communicate with each other through a return channel and at least the highest-pressure stage is provided with a movable wicket gate. The control method is applicable to the period of time during which the mode of operation is shifted from idling operation before power generating or the pumping, to the power generating operation or the pumping operation.

2. Description of the Prior Art

In single-stage hydraulic machines used in pumped storage power plants, highly pressurized air is in general fed by a water level depressor to a point above the water level at the upper part of a suction pipe in order to reduce the torque for driving a runner during the turbine starting operation or the pump starting operation. The air thus fed causes the water level to go down so that the runner is operated in air. Thereafter, the air fed into the channel path is exhausted and the water level goes up and the flow path is filled with water. In this manner, the hydraulic machine is changed in mode of operation to a predetermined turbine generating or pumping operation.

In a multi-stage hydraulic machine having a plurality of stages, the runner chambers of adjacent stages communicate with each other through a return channel. Therefore, the multi-stage hydraulic machine has a complicated channel system. Thus, various difficulties are found in the air exhausting operation when an idling operation is shifted to the power generating operation or the pumping operation.

Particularly in the case of a multi-stage hydraulic machine provided with movable wicket gates in the highest-pressure stage, in order to safely control the driven condition during this transition phase, the channels of the respective stages from the highest-pressure stage to the lowest-pressure stage are in constant communication with each other.

When the mode of operation is shifted from idling operation to power generating or pumping, water is fed from the runner chamber of the lowest-pressure stage to the runner chamber of the highest-pressure stage. Consequently, highly pressurized water driven by the runner of the lowest-pressure stage is rapidly fed into the highest-pressure stage so that the air in the highest-pressure stage is compressed, and at the same time the runner chamber in the highest-pressure stage is rapidly filled by the highly pressurized water.

As a result, the water pressure of the runner chamber in the highest-pressure stage is quickly raised and the driving torque for the runner is rapidly increased from a torque necessary for idling operation to a torque necessary for an underwater shut-off state in which the runner chamber is filled with water. Thus such a multi-stage hydraulic machine receives a shock force. Moreover, an impulsive twist force is applied to a shaft of the motor which drives the runner of the hydraulic machine, and consequently the electric power regulation in the electric power system to which the motor is connected is difficult.

Therefore, the conventional multi-stage hydraulic machine is a relatively small capacity type, and it uses an underwater starting system in which the hydraulic machine is started in the state that each runner chamber is filled with water, without depressing the water level even when the pumping operation is started, and the machine runners are then accelerated to a rated speed in this state.

In a large capacity type multi-stage hydraulic machine in which the adoption of such an underwater starting system would be difficult, the safe and smooth shifting from an idling operation to a power generating or pumping operation is, however, an important technical problem to be solved.

SUMMARY OF THE INVENTION

The present invention has been made in consideration of the above mentioned circumstances and has as its object to provide a multi-stage hydraulic machine and a control method for a multi-stage hydraulic machine according to which, while the idling operation is changed to the power generating operation or the pumping operation, air can be reliably exhausted and a smooth shift to the power generating operation or the pumping operation is ensured without generating shock force to the shaft.

According to an aspect of the present invention, there is provided a control method for a multi-stage hydraulic machine which includes a rotatable shaft, a plurality of runners fixed to said shaft and arranged from a highest-pressure stage to a lowest-pressure stage, runner chambers in which are respectively housed the runners, a return channel connecting adjacent ones of said runner chambers with each other, movable wicket gates provided at least in the highest-pressure stage and capable of moving between a position in which the movable wicket gates block the channel and a position in which said movable wicket gates open the channel, and a casing connected to said highest-pressure stage.

The method includes a first step of causing the movable wicket gates to block the channel, a second step of feeding air to the runner chamber of the highest-pressure stage to lower the water level in the channel below the runner chamber of the lowest-pressure stage, and a third step of shifting the mode of idling operation of the shaft to a turbine generating or pumping operation. The third step includes a first process of exhausting the runner chamber of the highest-pressure stage, a second process of using centrifugal force for feeding the water fed from a draft tube to the return channel connected to the runner chamber of the lowest-pressure stage, a third process of feeding a part of the water fed into said return channel back to the draft tube, a fourth process of sequentially exhausting air from the runner chamber of the stage lower than the highest-pressure stage to the lower-pressure stages not including the lowest-pressure stage, after the runner chamber of the highest-pressure stage reaches an underwater shut-off state, a fifth process of stopping exhaustion of a part of water from the return channel to the draft tube in the third process and, at the same time, exhausting air in the runner chamber of the lowest-pressure stage when the runner chambers of each stage except the lowest-pressure stage reach an underwater shut-off state, and a sixth process of stopping exhaustion of the air from the runner chambers of each pressure stage when the pressure of the runner chamber of the highest-pressure stage reaches a predetermined value. The method also includes a fourth step of opening the movable wicket gates.

According to an aspect of the present invention, there is also provided a multi-stage hydraulic machine which includes a rotatable shaft, a plurality of runners fixed to the shaft and arranged from a highest-pressure stage to a lowest-pressure stage, runner chambers which respectively house the runners, a return channel connecting adjacent ones of the runner chambers with each other, movable wicket gates provided at least in the runner chamber of the highest-pressure stage and capable of moving between a position in which the movable wicket gates block the channel and a position in which said movable wicket gates open the channel, a draft tube connected to the runner chamber of the lowest-pressure stage, means for feeding compressed air into the runner chamber of the highest-pressure stage, a communicating pipe connected with the runner chamber of each of the stages and having a valve, a water feeding pipe having a valve communicated between the return channel adjacent to the runner chamber of the lowest-pressure stage and the draft tube, a plurality of pressure detecting means arranged at the runner chamber of each of the stages, respectively, and means for controlling the valves of the communicating pipe and water feeding pipe in response to the output of the pressure detecting means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
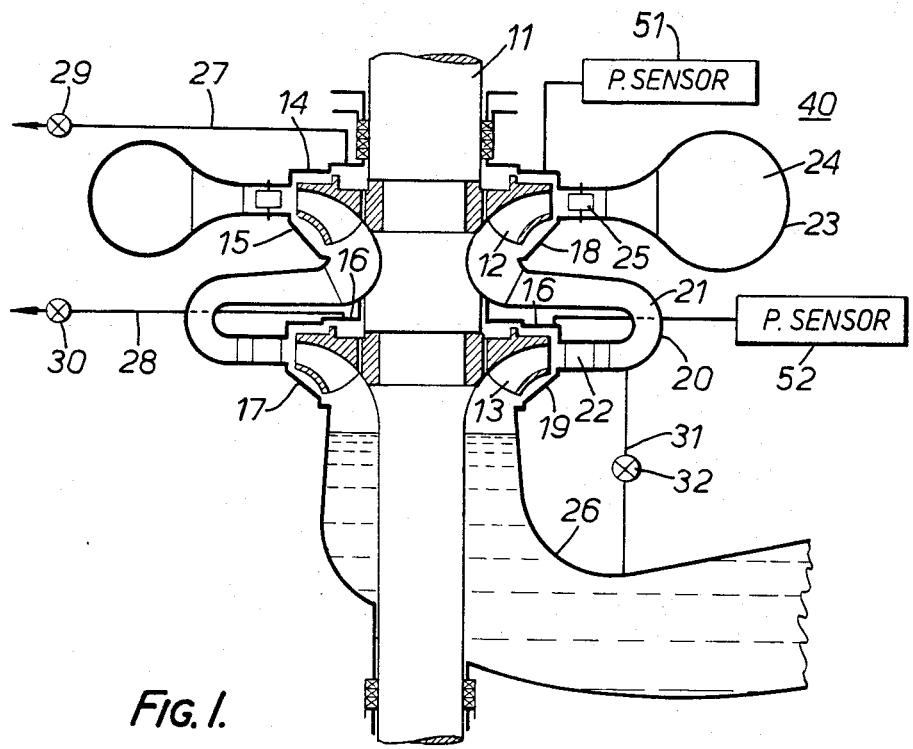
FIG. 1 is a longitudinal sectional view schematically showing a two-stage Francis type reversible pump turbine in an idling operation mode according to a first embodiment of a control method of the present invention.
Figure 2:
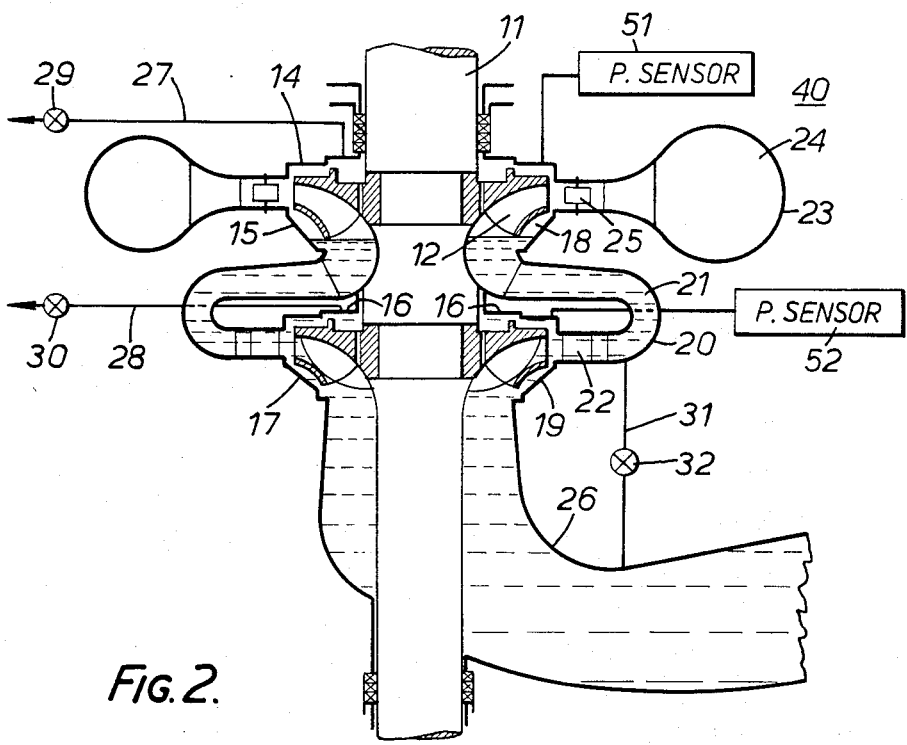
FIGS. 2 and 3 are longitudinal sectional views showing transitions of the pump turbine of FIG. 1 in a water-filling/air-exhausting operation mode.
Figure 3:
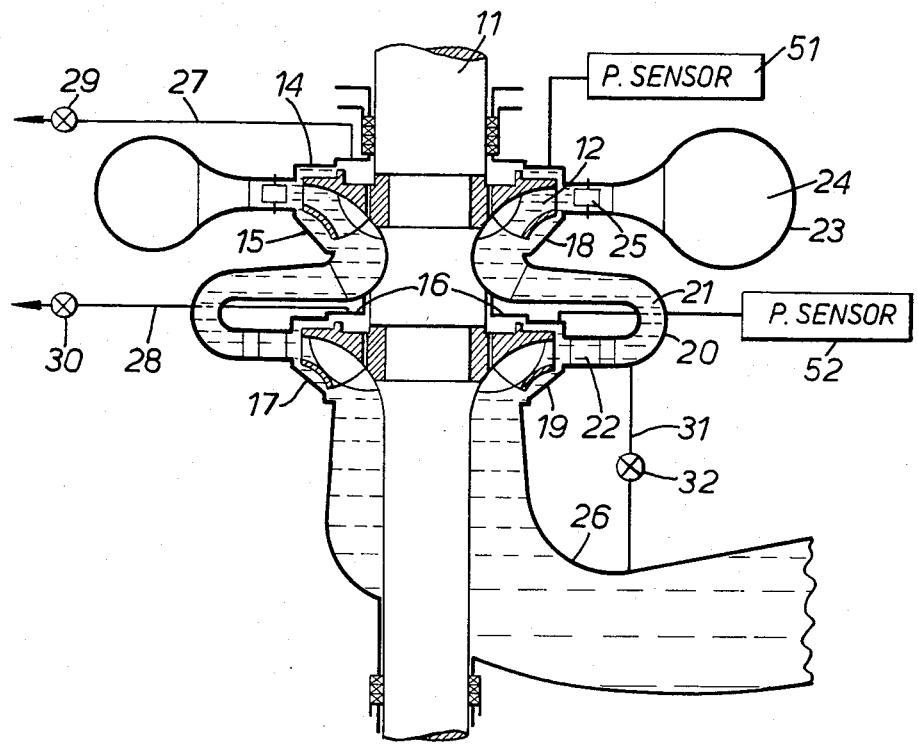

An embodiment of a control method for a multi-stage hydraulic machine according to the present invention will be described in detail below with reference to FIGS. 1 to 3.

Referring to a construction of a multi-stage hydraulic machine used in this embodiment, a two-stage Francis type reversible pump turbine 40 is used as one example of the multi-stage hydraulic machine in order to most easily understand the present invention. The pump turbine 40 has a main shaft 11 rotatably disposed along the vertical direction. To this shaft 11 is mounted a high-pressure stage runner 12 and a low-pressure stage runner 13. The runners 12 and 13 are spaced apart from each other by a predetermined distance along the direction of the axis of the main shaft 11. The main shaft 11, the high-pressure stage runner 12 and the low-pressure stage runner 13 constitute movable members.

Stationary members are provided around the movable members mentioned above. These stationary members are fixed underground in concrete. The stationary members include a first upper cover 14 and a first lower cover 15 which define a high-pressure stage runner chamber 18 therebetween. The high-pressure stage runner 12 is housed in the high-pressure stage runner chamber 18. Below the first lower cover 15 are disposed a second upper cover 16 and a second lower cover 17 which define a low-pressure stage runner chamber 19 therebetween. The low-pressure stage runner 13 is housed in this low-pressure stage runner chamber 19. The high-pressure stage runner chamber 18 communicates with the low-pressure stage runner chamber 19 through a return channel 20. A return vane 21 is disposed substantially at the central position of the return channel 20. A stay vane 22 is disposed in the portion of the return channel 20 where it is open to the low-pressure stage runner chamber 19.

A spiral casing 23 is disposed outside the high-pressure stage runner chamber 18. The interior of this spiral casing 23 defines a vortex chamber 24. The outlet of the vortex chamber 24 and the high-pressure stage runner chamber 18 communicate with each other. The inlet of the vortex chamber 24 is connected through an inlet valve (not shown) to a penstock (not shown) which is connected to an upper reservoir (not shown). A plurality of movable wicket gates 25 are disposed in the water channel outside the high-pressure stage runner 12. The movable wicket gates 25 are coaxial with the main shaft 11 and pivotal between a position in which they close the water channel and a position in which they open it. The opening of the movable wicket gates 25 is accomplished by use of a wicket gate actuator mechanism (not shown).

One end of a elbow-shaped draft tube 26 is connected to the low-pressure stage runner chamber 19. The other end of the draft tube 26 is in communication with a tailrace (not shown) which is connected to a lower reservoir (not shown).

A first exhaust pipe 27 is connected to the first upper cover 14 which partially defines the high-pressure stage runner chamber 15. The first exhaust pipe 27 communicates with the outer atmosphere through a first exhaust valve 29. On the other hand, a second exhaust pipe 28 is connected to the second upper cover 16 which partially defines the low-pressure stage runner chamber 19. This second exhaust pipe 28 communicates with the outer atmosphere through a second exhaust valve 30.

The return channel 20 and the draft tube 26 are directly connected to each other by a feed water pipeline 31 having a feed water valve 32. The pipeline 31 connects to the return channel 20 at a point outside the low-pressure stage runner chamber 19.

On the outer and upper chamber wall of each stage, that is, the highest-pressure stage and the lowest-pressure stage, the pressure detecting devices 51 and 52 are mounted, respectively. Furthermore, a water level depressor (not shown) is connected to the high-pressure stage runner chamber 15.

When the reversible pump turbine 40 with the above structure is operated as a turbine, all of the valves 29, 30 and 32 are closed. In this condition, water flows from the upper reservoir as pressurized water into the vortex chamber 24 of the spiral casing 23 via the penstock and the inlet valve. The pressurized water passes through the movable wicket gates 25 and impinges on the high-pressure stage runner 12, so that the main shaft 11 rotates. Thereafter, the pressurized water flows through the return channel 30 and impinges on the low-pressure stage runner 13, so that the main shaft 11 rotates further. Thereafter, the water flows through the draft tube 26 and finally is exhausted to the lower reservoir.

On the other hand, if the reversible pump turbine 40 is operated as a pump, a motor (not shown) rotates the main shaft 11 at the same rotational frequency as in the previous case in which it is operated as a turbine, but in the opposite direction. Therefore, the water pumped up by the low-pressure stage runner 13 is further urged by the high-pressure stage runner 12 and directed to the upper reservoir along a route in reverse to that of the former case where the reversible pump turbine 40 is operated as a turbine.

The following detailed description will be given to explain the control method for the reversible pump turbine 40 discussed above when it is changed from the state in which the main shaft 11 is idled to the state in which the reversible pump turbine 40 is operated to generate power or to pump water.

Prior to the idling operation, the movable wicket gates 25 are first completely closed. Then, the inlet valve between the vortex chamber 24 and the penstock is opened so that pressurized water is filled in the vortex chamber 24. Thereafter, compressed air is fed into the high-pressure stage runner chamber 18 through the first exhaust pipe 27 from the water level depressor, whereby the water within the high-pressure stage runner chamber 18 is pressed down through the return channel 20 and the low-pressure stage runner chamber 19 into the draft tube 26, as shown in FIG. 1. In the condition shown in FIG. 1, the main shaft 11 starts to idle for generation of power or for pumping.

In order to change the mode of operation from idling to power generation or pumping, the first exhaust valve 29 is first opened.

As a result, the exhaust of air within the high-pressure stage runner chamber 18 is commenced and at the same time the water level which was depressed below the low-pressure stage runner chamber 19 is gradually raised. When the water reaches the lower end of low-pressure stage runner 13, the water is fed into the return channel 20 through the low-pressure stage runner chamber 19 by the rotary centrifugal force of low-pressure stage runner 13. As a result, the feeding of water into return channel 20 is commenced and at the same time the feed water valve 32 in feed water pipeline 31 is opened. Consequently, a part of the water fed from low-pressure stage runner chamber 19 into return channel 20 is exhausted into draft tube 26 through feed water pipeline 31.

In this case, it is assumed that Q1 represents water flow which is fed from draft tube 26 through low-pressure stage runner chamber 19 into return channel 20 by virtue of rotary centrifugal force in accordance with the air-exhaust from high-pressure stage runner chamber 18. Q2 represents water flow which is exhausted into draft tube 26 via feed water pipeline 31, and Q3 represents water flow which is fed into high-pressure stage runner chamber 18 through return channel 20. The following relationship is then satisfied:

$$Q3 = Q1 - Q2.$$

Therefore, since water flow Q3 is reduced because water flow Q2 is subtracted from water flow Q1, the rapid feeding of water from return channel 20 into high-pressure stage chamber 18 is prevented, whereby stable water feeding to the high-pressure stage runner chamber is achieved.

Thereafter, the return channel 20 communicated between low-pressure stage runner chamber 19 and high-pressure stage runner chamber 18 is filled with water, and after the water has reached the lower end of high-pressure stage runner 12, the water transmitted from the low-pressure stage is fed into the outer side of high-pressure stage runner 12 by virtue of rotary centrifugal force.

Thus the water supplied from the low-pressure stage is subsequently fed into the high-pressure stage. After the return channel of each stage from the lowest-pressure stage to the highest-pressure stage is, as mentioned above, filled with water, the water which has been fed from the low-pressure stage to the inside of movable wicket gates 25 by virtue of rotary centrifugal force is gradually accumulated in high-pressure stage runner chamber 18 (the highest-pressure stage in the multistage hydraulic machine having three stages or more). When the region filled with water in high-pressure runner chamber 18 is enlarged to the inner side of high-pressure stage runner 12 and the high-pressure stage reaches an underwater shut-off state as shown in FIG. 3, the second exhaust valve 30 of second exhaust pipe 28 which is communicated with the low-pressure stage runner chamber 19 immediately below the highest-pressure stage is opened, whereby the exhaust from this low-pressure stage runner chamber 19 is commenced via second exhaust pipe 28. At the same time, the feed water valve 32 is fully closed. As a result, the exhaust of water from return channel 20 at a point outside from the lowest-pressure stage runner chamber 19 into draft tube 26 is terminated.

Where there are more than two stages, when the high-pressure stage is filled with water and reaches the underwater shut-off state, the exhausting of air in the immediately adjacent low-pressure stage is initiated, and the air exhausting and water filling are then sequentially achieved from the highest-pressure stage to succeeding lower-pressure stages in order. When all stages except the lowest-pressure stage reach the underwater shut-off state, the water being exhausted from the return channel 20 at a point communicated with outer peripheral side of the lowest-pressure stage runner chamber is terminated. Simultaneously the exhaust of air from the lowest-pressure stage runner chamber 19 is initiated.

Thereafter, when the water pressure in the high-pressure stage runner chamber 18 reaches a predetermined pressure level in which desired pressures of the underwater shut-off state of each of the stages are met, exhaust valves 29 and 30 of exhaust pipes 27 and 28 at each stage are completely closed.

Then, the movable wicket gates 25 are gradually brought to a predetermined opening through a drive mechanism (not shown) to establish communication between the high-pressure stage runner chamber 18 and the spiral casing 23 through the movable wicket gates 25. Generation of power or pumping is thus initiated. In this manner, the idling operation mode is smoothly shifted to the power generating or pumping operation mode.

It is to be noted that the underwater shut-off state in the high pressure stage in which the water is filled in runner chamber 18 is detected by a pressure detector 51 which is mounted on the chamber wall (first upper cover 14) of the high-pressure stage for opening second exhaust valve 30. The pressure detector 52 performs the same function in the low pressure stage.

In a multi-stage pump turbine which comprise more than three stages, the exhaust operation from each runner chamber in a lower-pressure stage can be commenced by using a timer which can output a signal for opening the exhaust valve at a predetermined time interval after opening valve 29, in order.

The termination of the exhausting of the water from return channel 20 at a point from lowest-pressure stage runner chamber 19 into draft tube 26 by closing feed water valve 32 can be accomplished on the basis of a detection signal from the pressure detector 51 mounted on the highest-pressure stage.

It should be apparent in accordance with the teachings of the present invention that by exhausting a subtracted margin of water flow from the water flow fed from draft tube and through low-pressure stage runner chamber, back into the draft tube via the feed water pipeline, i.e. by provision of the feed water pipeline between each return channel and the draft tube, a suitable water flow can be supplied to the higher-pressure stage so as not to cause any abnormal torque change, or abnormal water-pressure raising.

Moreover, since the commencing of exhausting the air from the runner chambers and the completion of margin water flow to be exhausted into draft tube is achieved from a high-pressure stage, except the highest-pressure stage, to a low-pressure stage in order when each stage reaches the underwater cut-off state after the highest-pressure stage reaches the underwater shut-off state, it is possible to stably and smoothly fill the runner chambers with water without a shock force to the shaft or runner or to abnormally influence the electric power system.

Furthermore, according to the present invention, it is possible to safely and smoothly change from idling operation to turbine operation or pump operation without generating vibration and noise because the prior art controlling means wherein the pressurized water in the casing is used to fill the runner chamber of each stage is not employed.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A control method for a multi-stage hydraulic machine which comprises a rotatable shaft; a plurality of runners fixed to said shaft and arranged from a highest-pressure stage; runner chambers in which are respectively housed said runners; a return channel connecting adjacent ones of said runner chambers with each other; movable wicket gates provided in at least the said highest-pressure stage and capable of moving between a position in which said movable wicket gates block said channel with one said runner chamber and a position in which said movable wicket gates open said channel; and a casing connected to said highest-pressure stage, said method comprising:
a first step of causing said movable wicket gates to block said channel;
a second step of feeding air to said runner chamber of the highest-pressure stage to lower a water level in said hydraulic machine to a draft tube positioned below said runner chamber of the lowest-pressure stage;
a third step of shifting a mode of idling operation of said shaft to one of a turbine generating and pumping operation,
said third step including:
a first process of exhausting air in said runner chamber of the highest-pressure stage, whereby said water level rises to said runner chamber of the lowest-pressure stage;
a second process of using the rotary centrifugal force of the lowest-pressure stage runner for feeding water from said draft tube to the return channel connected to said runner chamber of the lowest-pressure stage;
a third process of feeding a part of the water fed into said return channel back to said draft tube;
a fourth process of sequentially exhausting air from said runner chambers of stages below said highest-pressure stage, beginning with a stage immediately below said highest-pressure stage, except said lowest-pressure stage, after said runner chamber of said highest-pressure stage reaches an underwater shut-off state;
a fifth process of stopping said exhaustion of a part of the water from said return channel to said draft tube in said third process and, at the same time, exhausting air in said runner chamber of said lowest-pressure stage, when said runner chambers of every stage except said lowest-pressure stage reach an underwater shut-off state; and
a sixth process of stopping exhaustion of the air from said runner chambers of each pressure stage when the pressure of said runner chamber of said highest-pressure stage reaches a predetermined value; and
a fourth step of opening said movable wicket gates.

2. The control method for a multi-stage hydraulic machine according to claim 1, wherein in said fourth and fifth processes, the exhausting of air from said runner chambers of each pressure stage except said highest-pressure stage iscommenced after a predetermined time interval after the runner chamber of said highest-pressure stage reaches said underwater shut-off state.

3. The control method for a multi-stage hydraulic machine according to claim 1, wherein in said fifth process, the water pressure in said return channel connected to said runner chamber of the lowest-pressure stage is detected, and said exhaustion of a part of the water from said return channel to said draft tube is stopped on a basis of said detection of water pressure.

4. The control method for a multi-stage hydraulic machine according to claim 1, wherein in said fifth process, the water pressure in said runner chamber of the highest-pressure stage is detected, and said exhaustion of a part of the water from said return channel to said draft tube is stopped on a basis of said detection of water pressure.

5. A multi-stage hydraulic machine which comprises:
a rotatable shaft;
a plurality of runners fixed to said shaft and arranged from a highest-pressure stage to a lowest-pressure stage;
runner chambers which respectively house said runners;
a return channel connecting adjacent ones of said runner chambers with each other;
movable wicket gates provided at least in a channel of the highest-pressure stage and capable of moving between a position in which said movable wicket gates block said channel and a position in which said movable wicket goes open said channel;

a draft tube connected to the runner chamber of the lowest-pressure stage;

means for feeding compressed air into said runner chamber of said highest-pressure stage;

a communicating pipe, including a valve, connected with said runner chamber of each of said stages;

a water feeding pipe, including a valve, communicated between a portion of said return channel adjacent to said runner chamber of the lowest-pressure stage and said draft tube;

a pressure detecting means arranged at said runner chamber of each of said stages, respectively; and means for controlling said valves of said communicating pipes and water feeding pipe in response to an output of said pressure detecting means;

wherein said means for controlling said valves includes means for sequentially opening said valve of each said communicating pipe from a stage immediately below said highest-pressure stage to said lowest-pressure stage when the output of said pressure detecting means mounted on said highest-pressure stage exceeds a first predetemined value, means for closing said valve of the water feeding pipe when the output of said pressure detecting means mounted on the stage adjacent to said lowest-pressure stage exceeds a second predetermined value, and means for closing said valves of each said communicating pipe when the output of said pressure detecting means mounted on said highest-pressure stage exceeds a third predetermined value.

6. A multi-stage hydraulic machine according to claim 5, wherein said means for feeding compressed air into said runner chamber of said highest-pressure stage includes a water level depressor.

* * * * *